United States Patent
Kraus et al.

(10) Patent No.: US 6,789,936 B1
(45) Date of Patent: Sep. 14, 2004

(54) INFRARED THERMOMETER FOR PERFORMING TEMPERATURE MEASUREMENTS AT DIFFERENT SITES

(75) Inventors: Bernhard Kraus, Braunfels (DE); Frank Beerwerth, Runkel-Ennerich (DE); Klaus Amsel, Schmitten (DE)

(73) Assignee: Braun GmbH, Kronberg Im Taunus (DE)

( * ) Notice: Subject to any disclaimer, the term of this patent is extended or adjusted under 35 U.S.C. 154(b) by 284 days.

(21) Appl. No.: 09/598,060

(22) Filed: Jun. 20, 2000

(30) Foreign Application Priority Data

Jun. 28, 1999 (DE) .......................................... 199 29 503

(51) Int. Cl.$^7$ .............................. G01J 5/00; G01K 1/08
(52) U.S. Cl. ......................... 374/121; 374/158; 374/209
(58) Field of Search ................................ 374/121, 131, 374/158, 208, 209; 600/474, 549

(56) References Cited

U.S. PATENT DOCUMENTS

| | | | | |
|---|---|---|---|---|
| 5,066,142 A | * | 11/1991 | DeFrank et al. | 374/208 |
| 5,871,279 A | * | 2/1999 | Mooradian et al. | 374/130 |
| 5,893,833 A | * | 4/1999 | Pompei et al. | 206/212 |
| 6,047,205 A | * | 4/2000 | Pompei | 374/121 |
| 6,149,297 A | * | 11/2000 | Beerwerth et al. | 340/541 |
| 6,152,595 A | * | 11/2000 | Beerwerth et al. | 374/131 |
| 6,152,596 A | * | 11/2000 | Fraden | 374/158 |
| 6,236,880 B1 | * | 5/2001 | Raylman et al. | 600/436 |
| 6,292,685 B1 | * | 9/2001 | Pompei | 374/121 |
| 6,319,206 B1 | * | 11/2001 | Pompei et al. | 600/549 |
| 6,332,090 B1 | * | 12/2001 | DeFrank et al. | 374/126 |
| 6,499,877 B2 | * | 12/2002 | Pompei | 374/133 |
| 6,609,823 B2 | * | 8/2003 | Kraus et al. | 374/131 |
| 6,634,787 B1 | * | 10/2003 | Beerwerth et al. | 374/158 |
| 2002/0114376 A1 | * | 8/2002 | Yu | 374/158 |
| 2002/0181540 A1 | * | 12/2002 | Gerlitz | 374/121 |
| 2004/0047392 A1 | * | 3/2004 | Wu et al. | 374/121 |

* cited by examiner

Primary Examiner—Diego Gutierrez
Assistant Examiner—Yaritza Guadalupe
(74) Attorney, Agent, or Firm—Morgan Lewis & Bockius LLP

(57) ABSTRACT

The invention is directed to an infrared thermometer and a temperature calculation method suitable for determining the body temperature at different measurement sites, for example, on a person's forehead or in the ear.

Figure 1:
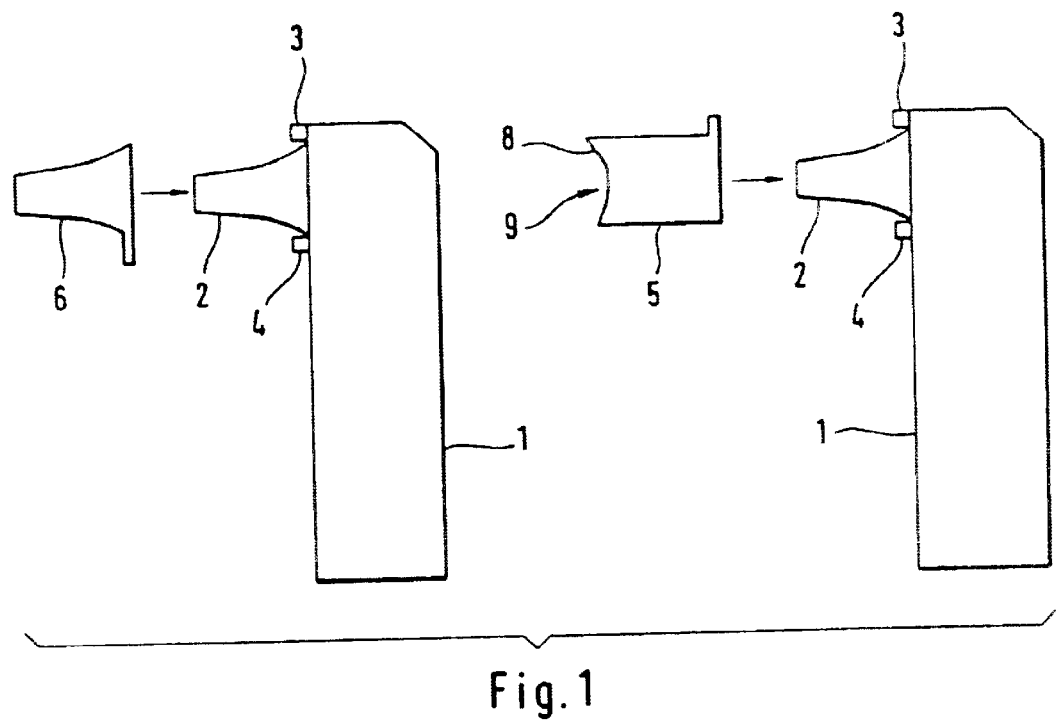

The thermometer includes a device for attaching a demountable probe head. Provision is made for different probe heads that are adapted to fit the different measurement sites.

17 Claims, 1 Drawing Sheet

INFRARED THERMOMETER FOR PERFORMING TEMPERATURE MEASUREMENTS AT DIFFERENT SITES

Infrared thermometers for determining body temperature have been in use for several years. Among the most widely known are infrared thermometers for measuring the temperature in a person's ear. Such an infrared thermometer is known from EP 0 388 463. It includes an infrared radiation sensor measuring the infrared radiation emitted by the measurement site, and an ambient temperature sensor measuring the temperature of the radiation sensor. The signals of both sensors are needed for determining the body temperature. Considering that the ear is readily accessible while at the same time affording reliable protection from external impact, accurate body temperature readings can be generally provided with this arrangement. However, in view of the temperature gradient in the ear canal, the measured temperature depends on how the thermometer is manipulated. This presents a problem particularly with small children where the probe of the thermometer does not fit into the ear canal because of the probe's relatively large diameter. Additional inaccuracies that may occur are attributable to the presence of cerumen in the ear canal or the use of contaminated protective covers.

Also commercially available are infrared thermometers which are suited to temperature measurement in the axilla or on the skin surface. Where body temperatures are taken in the axilla or on the forehead or in the temple region, measurement inaccuracies due to external impact are a frequent occurrence. Clinical tests have revealed that the differences to oral or rectal readings are greater here than the temperature measurement in the ear.

An infrared thermometer marketed under the designation National DM-T2S or BDM-T2A includes several detachable probe heads possessing differing outside diameters. The thermometer therefore has only a radiation inlet opening and a device for attaching the probe heads, making it necessary to select the appropriate probe head prior to a temperature measurement.

It is an object of the present invention to provide an infrared radiation thermometer and a method permitting the body temperature to be determined from readings taken at different sites on a person's body.

The present invention relates to an infrared thermometer which is suited to body temperature measurements at different sites—including, for example, a person's ear, mouth, forehead, skin, temple, rectum or axilla. In contrast to contact thermometers for oral, rectal or axillary measurements, the infrared thermometer requires however that it be adapted to fit the particular measurement site. A measurement in the ear necessitates a probe head that is sized to fit the ear diameter. In addition, the use of protective covers is advantageous in this case.

For measurements on the skin surface, for example, on the forehead or on the temple, means are advantageously provided in order to minimize errors introduced by reflection of infrared radiation on the skin surface. One possibility involves shielding of the measurement site and back-reflection of infrared radiation by means of a suitably shaped mirror. However, the mirror may be dispensed with if the measurement site is shielded by the probe head such that the radiation component reflected by the skin emanates from the probe head itself, rather than from the environment. By means of the known probe head temperature it is then possible to correct the measured radiation temperature correspondingly. During a measurement on the forehead or temple it is wise to scan a major area, meaning that the thermometer is moved across the skin surface, and to use the maximum temperature value measured during this manipulation for further calculation of the body temperature. A protective cover is not absolutely necessary for such measurements on the skin.

A thermometer of the present invention includes in a manner known in the art an infrared radiation sensor and an ambient temperature sensor. In the method of the present invention the body temperature T indicated by the thermometer is calculated in dependence upon the measured ambient temperature Ta which has a strong influence particularly on the skin temperature, the temperature Tb determined by radiation measurement in a manner known in the art from the signals of the ambient temperature sensor and the radiation sensor, and parameters determined during the prior calibration of the thermometer. To be able to compare the temperature readings taken at different locations on the body properly, the provision of an oral, rectal or core temperature equivalent by means of a corresponding calculation is appropriate. The body temperature T is calculated, for example, by applying the formula given below where d0, d1, d2, d3 and d4 are the parameters identified. This formula enables, for example, also the radiation component reflected by the skin to be taken into account. The non-linear influence of the body temperature on the skin temperature or the temperature in the ear canal can be taken into account by the parameters d3 and d4. This is advantageous because for a patient running a high temperature the then improved blood flow makes the surface temperature of the body less strongly dependent on the ambient temperature than for a person running no temperature:

$$T = Tb + d0 + d1(Tb-Ta) + d2(Tb-Ta)^2 + d3(Tb-Ta)(d4-Tb)$$

A first embodiment of an infrared thermometer of the present invention is illustrated schematically in FIG. 1. The Figure depicts a thermometer 1 having a probe tip 2 configured to perform a measurement in the ear and adapted to have affixed to it a probe head 5 suitably shaped for taking readings on a person's forehead. To do this, a first switch 3 is actuated which causes the temperature calculation method and some parameters to be switched from the ear to the forehead mode. Still further, the duration of measurement is increased from, for example, one second to five seconds giving the user sufficient time to move the thermometer across the forehead/temple. Advantageously, the thermometer indicates the maximum temperature measured.

Optionally, it is possible to attach to the probe tip 2 of the infrared thermometer 1 a protective cover 6 for performing measurements in the ear, the probe head 5 for measurements on the forehead, or to attach first the protective cover 6 and install the probe head 5 over the cover. A second switch 4 detects the presence or absence of a protective cover 6. The measurement method and the parameters used for evaluation are suitably selected by the first and second switch. It is also possible to substitute a single two-stage switch for two switches.

In a second embodiment of an infrared thermometer of the present invention, the thermometer is equipped with a radiation inlet opening and a fastening device in a manner known in the art. Suitable for attachment to the fastening device are not only a probe tip for taking temperature readings in the ear canal but also a probe head 5 for taking temperature readings on comparatively large skin surfaces.

In both embodiments the probe head 5 has an opening enabling infrared radiation to travel from the measurement site to the radiation inlet opening of the thermometer. To avoid contamination of the radiation inlet opening, the opening of the probe head 5 can be closed by a window 9 transparent to infrared radiation. The surface 8 of the probe head 5 for taking temperature readings on a person's forehead is preferably of a funnel-shaped configuration at the end remote from the measurement site to avoid corruption of the measurement result by infrared radiation emanating from the environment, which is reflected from the skin into the thermometer.

The thermometer herein described has the following particularly advantageous properties:

- The thermometer is suited to perform body temperature measurements at different sites, for example, in the ear, on the forehead or on the temple.
- The probe tips or probe heads are optimally adapted to the different measurement sites.
- Exchanging the probe tip or probe head automatically involves switching of the parameters for the method for calculating the body temperature.

To obtain accurate skin temperature readings it is important to make sure, also during scanning across the skin, that no radiation can be reflected from the environment into the thermometer. In addition, the measurement spot sensed by the thermometer has to be as small as possible and be of a constant size to achieve a good and uniform local temperature resolution. It is therefore necessary for the relative distance of the thermometer to the skin and for the angle between skin and thermometer to be maintained constant during the measurement. Both requirements can be satisfied by a movable probe head which invariably engages the skin during the measurement. As the thermometer is moved, the probe head follows the contour of the skin surface, even when the angle between the thermometer 1 and the skin surface varies.

Figure 2:
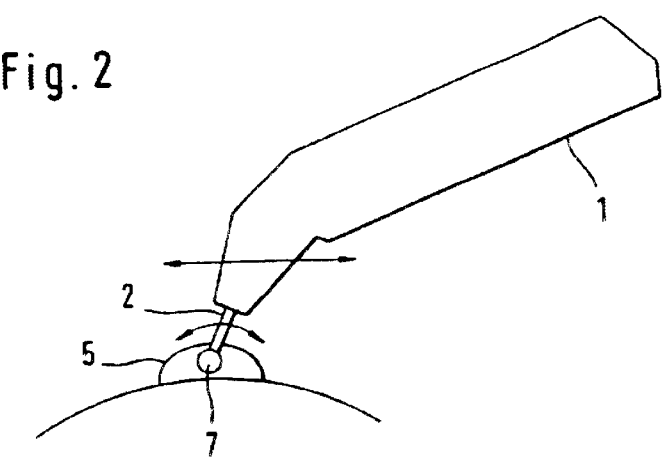

FIG. 2 shows such a thermometer schematically. The probe head 5 is connected with the probe tip 2 of the infrared thermometer 1 via a joint 7. The infrared sensor in the infrared thermometer senses a small measurement spot on the skin. The infrared radiation is passed through suitable optics (infrared fiber, metal tube, mirror, lenses) to the sensor. The hemispherical probe head 5 prevents the ingress of infrared radiation from the environment, maintaining at the same time a constant distance between sensor and skin. By detaching the movable probe head 5 (and substituting another probe head, if applicable) the skin thermometer can be converted into an ear thermometer.

In an embodiment of an infrared thermometer of the present invention, not shown in the figures, the probe tip 2 is pivotally secured to the infrared thermometer.

What is claimed is:

1. An infrared thermometer including an infrared sensor and a probe tip for taking temperature readings in an ear canal, said probe tip has a radiation inlet opening enabling infrared radiation to travel from a measurement site to the infrared sensor, wherein the infrared thermometer also includes a probe head (5) for taking temperature readings on skin surfaces that is demountably attachable to the probe tip (2).

2. The infrared thermometer as claimed in claim 1, wherein at least the probe head (5) or the probe tip (2) is pivotal in at least one spatial plane.

3. The infrared thermometer as claimed in claim 2, wherein the infrared thermometer includes a first switch (3) actuatable when a probe head (5) is installed, and that the calculation of a temperature indication value from the temperature measurement values is influenced by actuation of said first switch (3).

4. The infrared thermometer as claimed in claim 1, wherein the infrared thermometer includes a first switch (3) actuatable when a probe head (5) is installed, and that the calculation of a temperature indication value from the temperature measurement values is influenced by actuation of said first switch (3).

5. The infrared thermometer as claimed in claim 4, wherein the infrared thermometer includes a second switch (4) actuatable when a protective cover (6) is installed over the probe tip (2), and that the calculation of a temperature indication value from the temperature measurement values is influenced by actuation of said second switch.

6. The infrared thermometer as claimed in claim 1, wherein the probe head (5) includes an opening for infrared radiation.

7. The infrared thermometer as claimed in claim 6, wherein the geometrical shape of the probe head (5) is selected so that the measurement site is shielded from infrared radiation emanating from the environment.

8. The infrared thermometer as claimed in claim 7, wherein the surface (8) of the probe head (5) located at the end remote from the measurement site during a temperature reading is of a funnel-shaped configuration.

9. The infrared thermometer as claimed in claim 6, wherein the opening of the probe head (5) is closed by a window (9) transparent to infrared radiation.

10. An infrared thermometer including an infrared sensor and a radiation inlet opening enabling infrared radiation to travel from a measurement site to the infrared sensor, wherein the infrared thermometer also includes at least a probe tip (2) for taking temperature readings in an ear canal and a probe head (5) used in combination with the probe tip for taking temperature readings on skin surfaces, said probe head is demountably attachable to the thermometer (1).

11. The infrared thermometer as claimed in claim 10, wherein at least the probe head (5) or the probe tip (2) is pivotal in at least one spatial plane.

12. The infrared thermometer as claimed in claim 10, wherein the infrared thermometer includes a first switch (3) actuatable when a probe head (5) is installed, and that the calculation of a temperature indication value from the temperature measurement values is influenced by actuation of said first switch (3).

13. The infrared thermometer as claimed in claim 10, wherein the infrared thermometer includes a switch (4) actuatable when a protective cover (6) is installed over a probe tip (2), and that the calculation of a temperature indication value from the temperature measurement values is influenced by actuation of said switch (4).

14. The infrared thermometer as claimed in claim 10, wherein probe head (5) includes and an opening for infrared radiation.

15. The infrared thermometer as claimed in claim 14, wherein the geometrical shape of the probe head (5) is selected so that the measurement site is shielded from infrared radiation emanating from the environment.

16. The infrared thermometer as claimed in claim 14, wherein the surface (8) of the probe head (5) located at the end remote from the measurement site during a temperature reading is of a funnel-shaped configuration.

17. The infrared thermometer as claimed in claim 14, wherein the opening of the probe head (5) is closed by a window (9) transparent to infrared radiation.

* * * * *